Jan. 15, 1935.  A. W. MALL  1,987,837
PORTABLE GRINDING MACHINE
Filed June 1, 1934
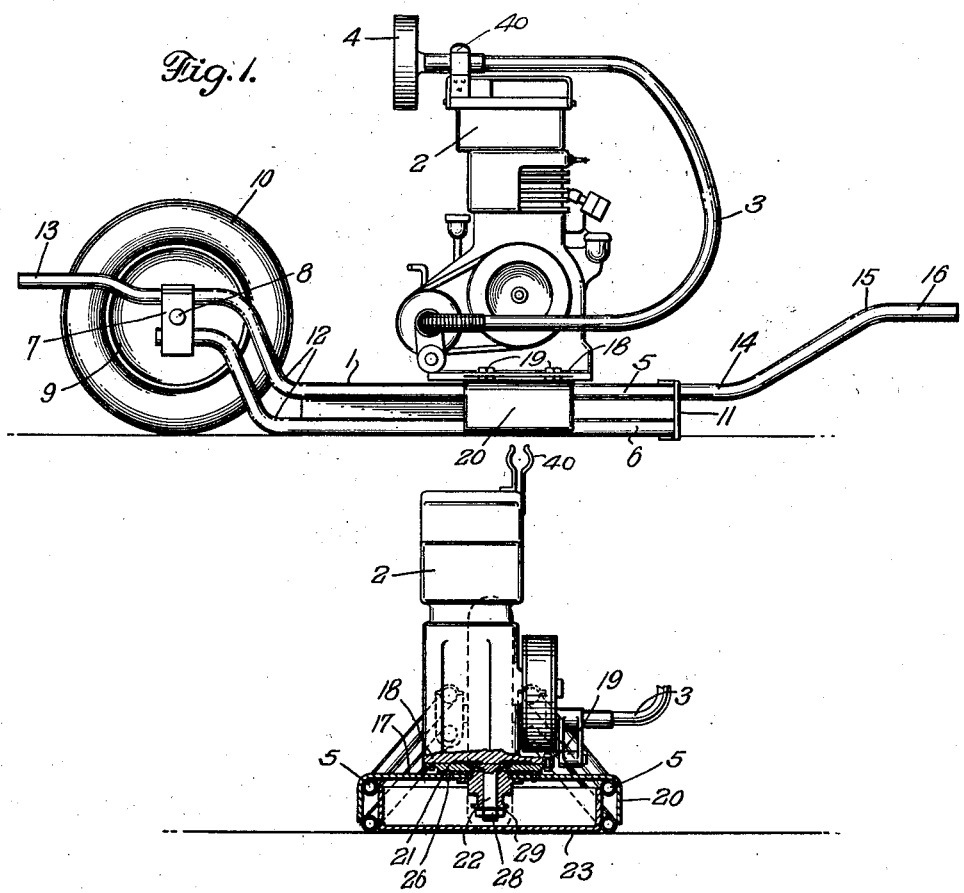
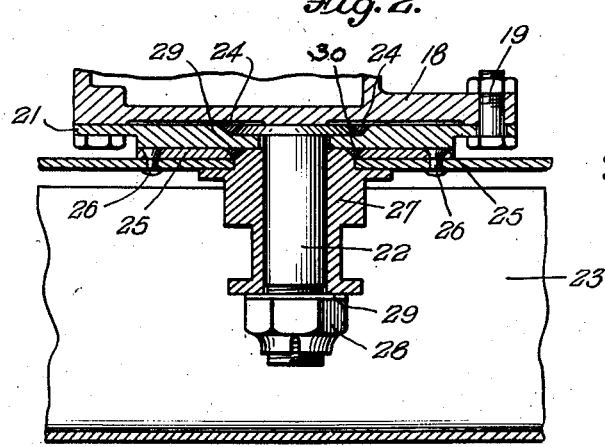
INVENTOR
ARTHUR W. MALL,
BY
ATTORNEY Patented Jan. 15, 1935

1,987,837

UNITED STATES PATENT OFFICE 1,987,837

PORTABLE GRINDING MACHINE

Arthur William Mall, Chicago, Ill.

Application June 1, 1934, Serial No. 728,602

3 Claims. (Cl. 51—170)

This invention relates to a machine or motor driven tool and more particularly has reference to a tool of this nature which is readily portable.

While portable machine tools comprising, a driven tool member, a power source for driving the same and a carriage or mounting member for the power source, have heretofore been developed, the prior art devices are characterized by several disadvantages which limit their utility, such as size, cumbersomeness, weight and lack of adjustability to operating or working conditions.

Many devices of this nature, due to their weight require three or more men to move or lift them. Also in industries where a tool must be quickly moved in order to prevent interference with normal industrial operations, it will be appreciated that extra men must be employed to warn those using the machine of the approach of conditions which would cause wreckage of the machine and/or the vehicle or instrument employed in carrying out the particular operation.

In going from one work position to another it is frequently necessary to move machines of this nature over rough surfaces, as for example a floor, road bed or the like. Where such is the case, weight again works to the disadvantage of these machines, which disadvantage is further increased by their cumbersomeness and the unwieldly character of the carrier or mounting carriage used to effect their transportation.

Where working space is limited, a large size machine is at a considerable disadvantage. This is especially true where, due to size, a large machine must be removed from its working position so as to prevent obstruction of industrial operations. On the other hand if the machine were of compact design no interference would be caused.

Moreover, in a machine comprising a carriage for a power source adapted to drive a tool member through a flexible drive shaft, the power source is rigidly mounted on the carriage. Hence, to adjust the machine to working conditions, it is necessary to properly and exactly position the entire device so that the work at hand may be properly conducted.

The present invention comprehends the provision of a novel machine tool of a readily portable nature. One manner of practically effecting this concept is to employ a monocycle carriage on which is mounted a power source connected through a flexible drive shaft to a tool member. The invention further comprehends, the construction expedient of swiveling the power source to its supporting member on the carriage so that the position of the power source may be easily adjusted to accommodate various work conditions, and at the same time automatically take up any slack in the flexible shaft.

It is the major object of this invention to provide a portable machine tool which ameliorates the disadvantages inherent in present day tools of this nature.

An equally important object of the invention is the provision of a machine tool of a portable nature which is of light weight, readily movable, of compact size and easily adjustable to all types of working conditions.

Another object of my invention is to provide a machine tool having a carriage member adapted to support a power source for actuating a tool member, the power source being so mounted on the carriage as to be capable of movement through 360° about an axis perpendicular to the surface of the carriage.

Still another object of the invention is the provision of a monocycle or wheel barrow type of support for a machine tool, whereby the machine may be readily and easily transported.

Yet another object of my invention is to construct a machine tool having a monocycle carriage adapted to support a power source which is freely rotatable thereon, about an axis perpendicular to the surface of the carriage support, the power source being employed to actuate a tool member.

A further object of the invention is the combination with a tool member and a power source for actuating the same through a flexible drive shaft, of a monocycle carriage member, the power source having a swivel mounting on the carriage.

With these and other objects in view, which may be incident to my improvements, the invention consists in the parts and combinations to be hereinafter set forth and claimed, with the understanding that the several necessary elements comprising my invention may be varied in construction, proportions and arrangement without departing from the spirit and the scope of the claims to be appended hereto.

In order to make my invention more clearly understood, I have shown in the accompanying drawing, means for carrying the same into practical effect without limiting the improvements in their useful applications to the particular constructions which, for the purpose of explanation, have been made the subject of illustration.

In the drawing:

Figure 1 is a side elevation of the machine tool forming the subject matter of this invention.

Figure 2 is an elevational and sectional view showing the power source and its mounting on the machine.

Figure 3 is a partial sectional view similar to Figure 2 but with the section being taken at right angles thereto and showing in more detail the power source mounting.

Referring to the drawing and more particularly to Figure 1 thereof, there is shown a machine tool comprising a monocycle carriage, designated generally by the numeral 1, having a power source 2 mounted thereon, the power take off shaft of the latter being coupled to a flexible drive member or shaft 3 for a tool element 4. A suitable clamp 40 is provided on the power source for carrying or supporting the tool 4 and shaft 3 when such is desired.

The carriage 1 is formed of metallic tubular members 5 and 6, two of such members being employed to form each side of the carriage. The left end of each frame member 5 and 6, as will be noted in Figure 1, is suitably secured or held in a bearing 7 adapted to support an axle 8 upon which is mounted a wheel 9. The wheel 9 is provided with a pneumatic tire 10 of the low pressure balloon type, the tread or bearing area of which is relatively large. It should be observed that the bearings 7, to which one end of each of the frame members 5 and 6 are secured, are rotatable on the axle 8.

At the right hand end of the machine, as viewed in Figure 1, an end plate 11 is provided. The frame members 5 and 6 pass through the plate 11 and are secured thereto in any suitable manner as for example by spot welding. It will be further noted that near the wheel 9, frame members 5 and 6 are bent upwardly, as indicated by numeral 12, while between this point and the end plate 11 they are straight. By such a construction expedient a substantially continuous support from the wheel bearing surface to the end plate 11 is provided. Obviously such a support will add to the stability of the machine during operation due to its large bearing area with the ground or other surface on which the machine rests.

Another added feature of the carriage construction resides in the fact that each upper frame member 5 is horizontally extended beyond the bearing 7 after its upward bend 12, as is indicated by the extension 13 and also at the right hand end of the carriage mounting, each member 5 is bent upwardly, as at 14 and then horizontally, as at 15, to form the extension 16. The extensions 13 and 16 on each upper frame member 5 provide grips or handles which permit the machine to be carried by two men if desired. Where only one man is employed to operate the machine the extensions 16 of the upper frame members are used as grips or handles to either push or pull the device in a manner similar to that of propelling a wheel barrow.

The power source 2, together with tool element 4 and its associated drive mechanism, are pivotally and adjustably mounted upon the support carriage by means of a swiveling arrangement. This support consists of a plate member 17 seated upon the side members 5, the power source 2 being pivotally mounted on the support plate 17 in a manner to be hereinafter described. Plate member 17 is formed with side pieces 20 which fit down over members 5 and the side pieces may be so constructed as to hold the plate 17 on the carriage by frictional engagement with the frame members 5 and/or 6 or the side pieces may be positively fixed to the frame members, as for example by spot welding. Also if desired supporting plate 17 may be so constructed and secured to the frame members as to be adjustable lengthwise or longitudinally of the carriage 1. Whatever construction is employed it will be obvious that the nearer the support plate 17 is to the wheel 9, the greater will be the weight carried by the wheel and its axle when the machine is moved by a single operator who pushes or pulls the same.

From an inspection of Figure 2, and as may be noted in more detail in Figure 3, it may be observed that the base 18 of the power source has bolted thereto, by means of bolts 19, a swivel plate 21. Swivel plate 21 has extending therethrough a swivel bolt or king pin 22, the head of which is counter sunk in the swivel plate and is secured to the latter in any suitable manner as for example by the spot welding indicated at 24. The bolt 22 is adapted to pass through a filler plate 25, the latter being secured to the support plate 17 by any desirable means, an instance of which is indicated by the rivets 26. Filler plate 25 is so constructed that its upper surface forms a bearing area or support for the swivel plate 21. Secured to the filler plate 25, in any conventional manner, is a swivel bushing 27 through which the bolt 22 passes, the end of the bolt which extends beyond the bushing being supplied with a castle nut or other securing means 28 and a washer 29. As shown the bushing 27 is welded to the filler plate by the weld 30, although any other desired means for securing the same thereto may be employed without departing from the scope of the invention or the spirit of the appended claims.

As should be observed the bolt 22 is secured to the swivel plate 21 at such a point with respect to the vertical or longitudinal axis of the power source that the latter may be securely and firmly supported on the plate 17 and its filler plate 25. Also to be considered is the fact that this construction allows the bolt 22, and consequently the power source, to turn through 360° within the bushing 27. Of course, if desired, a fitting of any sort may be associated with the bushing for the purpose of lubricating the same and the bolt 22 through the use of some lubricating medium such as oil or grease.

A tray 23 may be mounted between the side members for the purpose of holding tools and other articles which it is desired to carry with the machine.

In the operation of the device, the grinding element or other tool 4 is removed from its hanger or holder 40 and is applied to the work. As the tool is moved into various positions, the effective length of the connecting cable or flexible drive shaft 3 is varied, which results in a turning or twisting of the machine about its pivotal point. By means of the 360° swiveling arrangement herein disclosed, the flexible shaft is automatically fed out or taken in depending on the position of the tool. Also by the use of the pivoted power source it may be appreciated that the machine can be roughly located, at any angle, with respect to the object to be worked upon since the tool element may be swung to any position. Another important point resides in the fact that the swivel mounting allows the use of a shorter flexible drive shaft for the tool since the power source may be rotated about its pivot and further this construction prolongs the life of the shaft because, among other things, it is unnecessary to subject the flexible shaft 3 to rough handling and strain in order to move the tool to its working position.

When the work has been completed, the operator arrests the actuation of the power source, places the tool element on its hanger and through the medium of the handles 16, pushes or pulls the machine out of position and moves it to the next work location. Of course where there is a two man crew operating the machine, the same may be carried as a tray through the use of the handles or extensions 13 and 16.

The adaptability of the machine to difficult work conditions is well illustrated in its use for railway purposes, particularly rail grinding. It is to be understood, however, that the device is not limited to railway work only, but may be used in many varied industries. Due to its construction the machine is merely placed near the track that is to be worked upon and during such work only the tool element is in contact with the track. This feature eliminates the necessity of a large work crew including signal men to warn of the approach of trains and since due to the machine's size it may be left in position during the passage of a train over the track being worked upon, extra men on the crew to assist in placing the machine in the clear are not needed. Railway employment also serves to illustrate the ease with which the machine can be pushed or pulled over an uneven or rough surface as well as the stability of the machine when in operation while resting on such surface. One man, due to the pneumatic tired wheel, can bounce the device over the rails if it is desired to cross a track and of course the machine can be easily moved over the track ballast. The carriage with its low center of gravity and its relatively long length form a firm support for the machine when it is at rest even on very rough ballast. The extreme light weight of the device also allows its operation and transportation by a single man crew.

Although an internal combustion motor has been disclosed as providing the means for driving the tool element 4, it may be realized that any other type of motor desired may be employed. Also if desired the device may be used with tool elements other than a grinder such as is shown associated with the flexible drive shaft.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:—

1. In a portable machine tool, the combination of a carriage comprising a plurality of tubular members mounted in spaced relation to form a substantially rectangular shaped base, certain of said tubular members being formed with extensions terminating in handle portions, a power unit to drive a tool element, means to mount the power unit upon the carriage comprising a bearing plate having side pieces extending over the tubular members of the carriage, and a wheel having a pneumatic tire attached thereto, mounted for free rotation between the tubular members at one end of the carriage whereby the machine may be rolled to a working position as a unit.

2. In a portable machine tool the combination of a power unit for driving a tool element with a carriage mounted on a single pneumatic tired wheel, said carriage comprising a plurality of frame members fixed in spaced apart relation to form a substantially rectangular base, certain of said frame members being formed with extensions providing hand grips for moving the machine, means for mounting said wheel on the machine so that its bearing surface when the machine is at rest is tangent to an extension of the plane of the lower surface of said base, a plate mounted on said frame members, and means for mounting said power unit on said plate so that the power unit may be rotated through 360 arcuate degrees.

3. In a portable machine tool, the combination of a power unit having a flexible drive shaft for driving a tool element with a carriage mounted on a single pneumatic tired wheel, said carriage comprising a plurality of frame members fixed in spaced apart relation to form a substantially rectangular shaped base, certain of said frame members being formed with extensions providing hand grips, a plate mounted on said members, said plate being adjustable lengthwise of said carriage base, and means for mounting said power unit on said plate so that the power unit may be turned through 360 arcuate degrees.

ARTHUR W. MALL.